(12) United States Patent
Yadav

(10) Patent No.: US 9,397,946 B1
(45) Date of Patent: Jul. 19, 2016

(54) FORWARDING TO CLUSTERS OF SERVICE NODES

(71) Applicant: Cisco Technology, Inc., San Jose, CA (US)

(72) Inventor: Navindra Yadav, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 66 days.

(21) Appl. No.: 14/452,975

(22) Filed: Aug. 6, 2014

Related U.S. Application Data

(60) Provisional application No. 61/900,372, filed on Nov. 5, 2013.

(51) Int. Cl.
*H04L 12/803* (2013.01)
*H04L 12/743* (2013.01)
*H04L 12/819* (2013.01)

(52) U.S. Cl.
CPC .......... *H04L 47/125* (2013.01); *H04L 45/7453* (2013.01); *H04L 47/21* (2013.01)

(58) Field of Classification Search
None
See application file for complete search history.

(56) References Cited

U.S. PATENT DOCUMENTS

| | | | | |
|---|---|---|---|---|
| 2010/0287227 A1* | 11/2010 | Goel | ................... | H04L 67/1002 709/202 |
| 2010/0299553 A1* | 11/2010 | Cen | ................... | H04L 29/08729 714/4.1 |
| 2014/0047264 A1* | 2/2014 | Wang | ..................... | G06F 11/143 714/4.11 |
| 2015/0092551 A1* | 4/2015 | Moisand | ............. | H04L 67/1027 370/235 |

* cited by examiner

*Primary Examiner* — Charles C Jiang
*Assistant Examiner* — George Atkins, Jr.
(74) *Attorney, Agent, or Firm* — Polsinelli PC

(57) ABSTRACT

Systems, methods, and computer-readable storage media for forwarding traffic to clusters of nodes. A system can group nodes in a network fabric into a cluster of nodes, and generate respective hash buckets in the network fabric for the nodes, each respective hash bucket being generated based on a hash function applied to a subset of packet header fields. Next, the system receives a packet associated with a service provided by a node in the cluster, and assigns the packet to a hash bucket from the respective hash buckets based on a comparison of a hash value associated with the packet and hash values associated with the respective hash buckets. The system then selects a node in the cluster to service the packet, the node being selected based on the hash bucket assigned to the packet, the hash bucket being associated with the node.

20 Claims, 7 Drawing Sheets

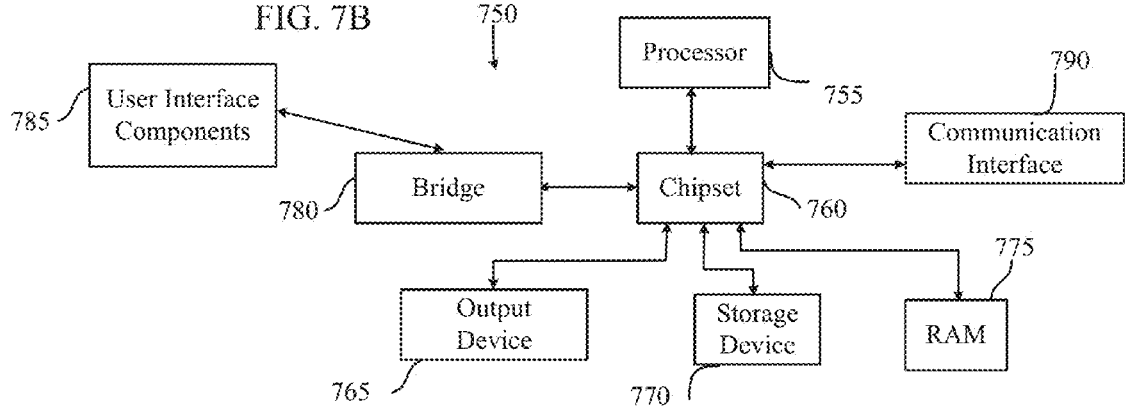
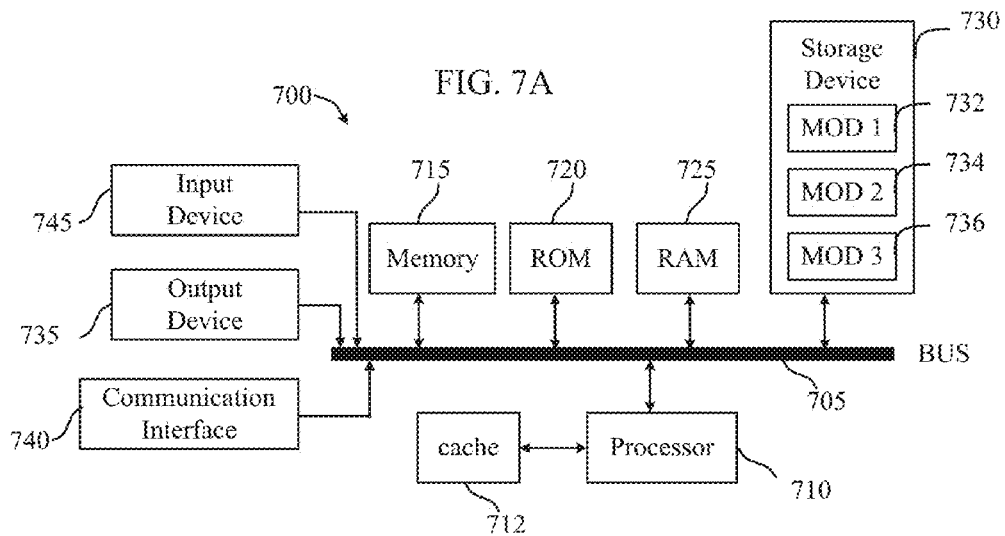

FORWARDING TO CLUSTERS OF SERVICE NODES

RELATED APPLICATIONS

This application claims priority to U.S. Provisional Patent Application No. 61/900,372, filed Nov. 5, 2013, the content of which is incorporated herein by reference in its entirety.

TECHNICAL FIELD

The present technology pertains to clusters of service nodes, and more specifically pertains to forwarding traffic to clusters of service nodes.

BACKGROUND

The soaring demand for network data and services throughout the globe has steadily fueled the evolution of networking technologies, as engineers and manufacturers rush to keep pace with the changing data and service consumption landscape. Various network technologies and application services have been deployed in networks precisely to meet this soaring demand for network data and services. However, while this advancement in network technologies has allowed networks to support such increased demand for network data and services, it has also resulted in larger and more complex environments, involving massive amounts of traffic data constantly being routed through the various elements in the network. Yet as the amount of traffic handled by the network grows, it becomes increasingly important to ensure efficient and redundant traffic forwarding and service provisioning strategies. Unfortunately, current solutions are prone to errors, delays, and poor quality of service, particularly in the larger, more complex environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 7A and 7B illustrate example system embodiments.

DESCRIPTION OF EXAMPLE EMBODIMENTS

Figure 1:
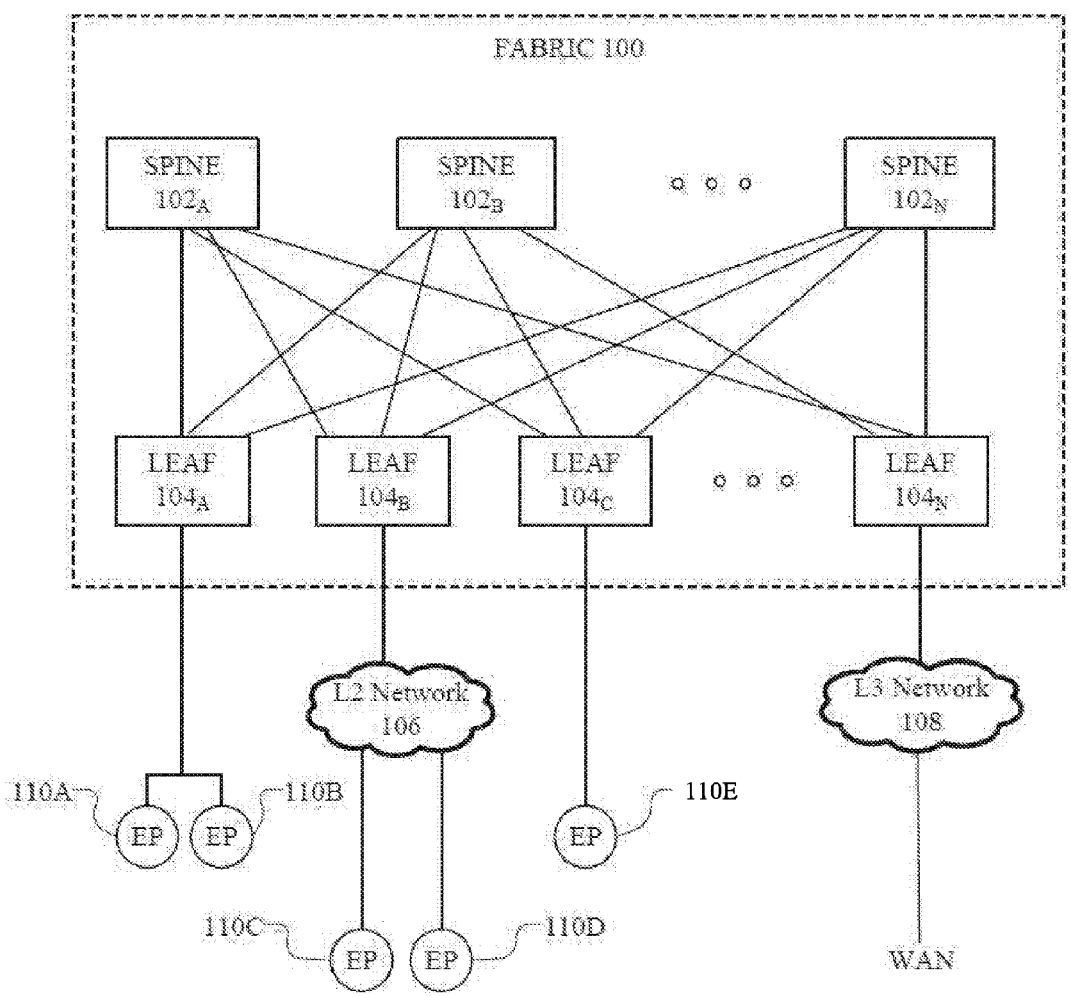
FIG. 1 illustrates a schematic block diagram of an example architecture for a network fabric.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Service nodes, such as firewalls (FWs), load balancers (LBs), application delivery controllers (ACDs), forwarding appliances, etc., are increasingly being deployed in networks as clusters. Clustering allows service nodes to scale and provide high availability and redundancy in the cloud deployments. Moreover, by deploying service nodes into clusters, networks are better capable of meeting today's high demand for network data and services, and are able to provide specific services with increasing efficiency, stability, and performance.

Clusters can be formed using layer 2 (L2) technologies, such as link aggregation groups (LAGs), port channels, and network interface controller (NIC) teaming; or layer 3 (L3) technologies, such as equal cost multipath protocol (ECMP) and virtual Internet Protocol (VIP). However, with the conventional approaches, a service node which receives a flow of traffic may not be the node that holds the flow state. As a result, the receiving node often must forward the flow back to the service node owning the flow state, which can then process the flow and send the flow onwards. Unfortunately, this process can be extremely inefficient and may result in significant delays and errors.

In addition, when service nodes process a flow, they often transform the layer 3 and layer 4 header fields in the packet. This is typically the case, for example, with transport control protocol (TCP) proxy, network address translation (NAT), IP destination NAT to IP source NAT load balancing, virtual private tunnel (VPN) termination, and so forth. As a consequence, the network, when load balancing the reverse flow to the service cluster, may rebalance the traffic to a different cluster member than the cluster member selected when load balancing the flow in the forward direction.

As a result, there is typically a loss of power at the service node, and a waste in bandwidth at the service node and network fabric. Indeed, there is often a latency experienced by the end-to-end data flow, an increased debugging complexity, as well as a host of other problems. Moreover, when a flow is created or aged to all members of a cluster, service nodes generally need to perform a 1:n sync of the service node which owns the flow. A 1:n sync of state, however, is complex and prone to many problems. For example, a 1:n sync can slow the feature velocity and negatively impact the customer experience.

On the other hand, the approaches disclosed herein can implement a coordinated mechanism that allows the network fabric (or a network controller) and the service cluster to use a hash on a subset of fields in the packet, such as a subset of header fields, to deterministically select a member of the cluster. For example, in some implementations, a controller in the network fabric can group service nodes in the network fabric into a cluster of service nodes. The controller can then generate respective hash buckets in the network fabric for the service nodes in the clusters of service nodes, each respective hash bucket being generated based on a hash function applied to a subset of packet header fields.

Next, the controller can receive a packet associated with a service provided by a service node in the cluster, and assign the packet to a hash bucket from the respective hash buckets based on a comparison of a hash value associated with the packet and hash values associated with the respective hash buckets. The controller can then select a service node in the cluster of service nodes to service the packet, the service node being selected based on the hash bucket assigned to the packet, the hash bucket being associated with the service node. Once the controller selects the service node, it can forward the packet to the service node for processing.

Thus, these approaches can provide consistent flow hashing semantics, which allows a TCP/IP flow in the network fabric to yield the same results in both directions. In other words, the hash can produce the same results even if the source and destination information are reversed, allowing the network fabric (or controller) to select the same service node in both directions of the flow. Moreover, when a new cluster member is added to the cluster, the maximum amount of flow redistribution can be limited, on average, to 1/n flows, where "n" can be the number of nodes in the cluster. Indeed, in most cases, the cluster members can support 1:1 high availability (HA), which can ensure that any disruption is eliminated altogether.

DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Also, as previously mentioned, service nodes, such as firewalls, load balancers, and application delivery controllers, can be deployed in networks, including overlay and physical networks, as clusters, which can be formed using L2 and L3 technologies. Such clusters can provide high availability and redundancy for flows associated with specific service appliances (nodes). A flow can include packets that have the same source and destination information. Thus, packets originating from device A to service node B can all be part of the same flow.

Clusters can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for accurate and efficient forwarding to clusters of service nodes. Disclosed are systems, methods, and computer-readable storage media for forwarding traffic to clusters of service nodes. A description of forwarding traffic to service nodes in clusters, related concepts, and example variations, as illustrated in FIGS. 1 through 5, is disclosed herein. A brief description of example devices, as illustrated in FIGS. 6 and 7A-B will then follow. These variations shall be described herein as the various embodiments are set forth. The disclosure now turns to FIG. 1.

FIG. 1 illustrates a schematic block diagram of an example architecture for a network fabric 100. The network fabric 100 can include spine switches $102_A$, $102_B$, ..., $102_N$ (collectively "102") connected to leaf switches $104_A$, $104_B$, $104_C$, ..., $104_N$ (collectively "104") in the network fabric 100.

Spine switches 102 can be L3 switches in the fabric 100. However, in some cases, the spine switches 102 can also, or otherwise, perform L2 functionalities. Further, the spine switches 102 can support various additional capabilities, such as communications at 40 or 10 Gbps Ethernet speeds. In some embodiments, the spine switches 102 can include one or more 40 Gigabit Ethernet ports. Each port can also be split to support other speeds. For example, a 40 Gigabit Ethernet port can be split into four 10 Gigabit Ethernet ports. This way, the links in the spine switches 102 can be increased, which can allow the network 100 to grow and additional devices to be added.

In some embodiments, one or more of the spine switches 102 can be configured to host a proxy function that performs a lookup of the endpoint address identifier to locator mapping in a mapping database on behalf of leaf switches 104 that do not have such mapping. The proxy function can do this by parsing through the packet to the encapsulated, tenant packet to get to the destination locator address of the tenant. The spine switches 102 can then perform a lookup of their local mapping database to determine the correct locator address of the packet and forward the packet to the locator address without changing certain fields in the header of the packet.

When a packet is received at a spine switch $102_i$, the spine switch $102_i$ can first check if the destination locator address is a proxy address. If so, the spine switch $102_i$ can perform the proxy function as previously mentioned. If not, the spine switch $102_i$ can lookup the locator in its forwarding table and forward the packet accordingly.

Spine switches 102 connect to leaf switches 104 in the fabric 100. Leaf switches 104 can include access ports (or non-fabric ports) and fabric ports. Fabric ports can provide uplinks to the spine switches 102, while access ports can provide connectivity for devices, hosts, endpoints, VMs, or external networks to the fabric 100.

Leaf switches 104 can reside at the edge of the fabric 100, and can thus represent the physical network edge. In some cases, the leaf switches 104 can be top-of-rack ("ToR") switches configured according to a ToR architecture. In other cases, the leaf switches 104 can be aggregation switches in any particular topology, such as end-of-row (EoR) or middle-of-row (MoR) topologies. The leaf switches 104 can also represent aggregation switches, for example.

The leaf switches 104 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 104 can contain virtual switching functionalities, such as a virtual tunnel endpoint (VTEP) function as explained below in the discussion of VTEP 208 in FIG. 2. To this end, leaf switches 104 can connect the fabric 100 to an overlay network, such as overlay network 200 illustrated in FIG. 2. Further, one or more spine switches and/or leaf switches 104 can include information defining service node and hash bucket mappings, as further explained in FIG. 4 below. In some embodiments, spine switches 102 and/or leaf switches 104 can include software algorithms or instructions for selecting service nodes, such as load balancers or any other appliance, and steering traffic to such selected service nodes, as will be further explained below.

Network connectivity in the fabric 100 can flow through the leaf switches 104. Here, the leaf switches 104 can provide servers, resources, endpoints, external networks, or VMs access to the fabric 100, and can connect the leaf switches 104 to each other. In some cases, the leaf switches 104 can connect EPGs to the fabric 100 and/or any external networks. Each EPG can connect to the fabric 100 via one of the leaf switches 104, for example.

Endpoints 110A-E (collectively "110") can connect to the fabric 100 via leaf switches 104. For example, endpoints 110A and 110B can connect directly to leaf switch 104A, which can connect endpoints 110A and 110B to the fabric 100 and/or any other one of the leaf switches 104. Similarly, endpoint 110E can connect directly to leaf switch 104C, which can connect endpoint 110E to the fabric 100 and/or any other of the leaf switches 104. On the other hand, endpoints 110C and 110D can connect to leaf switch 104B via L2 network 106. Similarly, the wide area network (WAN) can connect to the leaf switches 104C or 104D via L3 network 108.

Endpoints 110 can include any communication device, such as a computer, a server, a switch, a router, a hypervisor, a VTEP, a VM, a service node or appliance, etc. In some embodiments, the endpoints 110 can include a server, hypervisor, and/or switch configured with VTEP functionalities, which can connect an overlay network, such as overlay network 200 below, with the fabric 100. For example, in some cases, the endpoints 110 can represent one or more of the VTEPs 208A-D illustrated in FIG. 2. Here, the VTEPs 208A-D can connect to the fabric 100 via the leaf switches 104. The overlay network can host physical and/or virtual devices, such as servers, applications, EPGs, service nodes, virtual networks or segments, virtual workloads, etc.

In some embodiments, the endpoints 110 can include one or more clusters of virtual and/or physical devices, such as a cluster of service nodes, including VMs and/or servers; a cluster of switches; a group of endpoints; a cluster of storage devices; a cluster of hypervisors; a cluster of resources; etc. In addition, the endpoints 110 can host virtual workload(s), clusters, and applications or services, which can connect with the fabric 100 or any other device or network, including an external network. For example, one or more endpoints 110 can host, or connect to, a cluster of load balancers or an EPG of various applications.

Although the fabric 100 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 2:
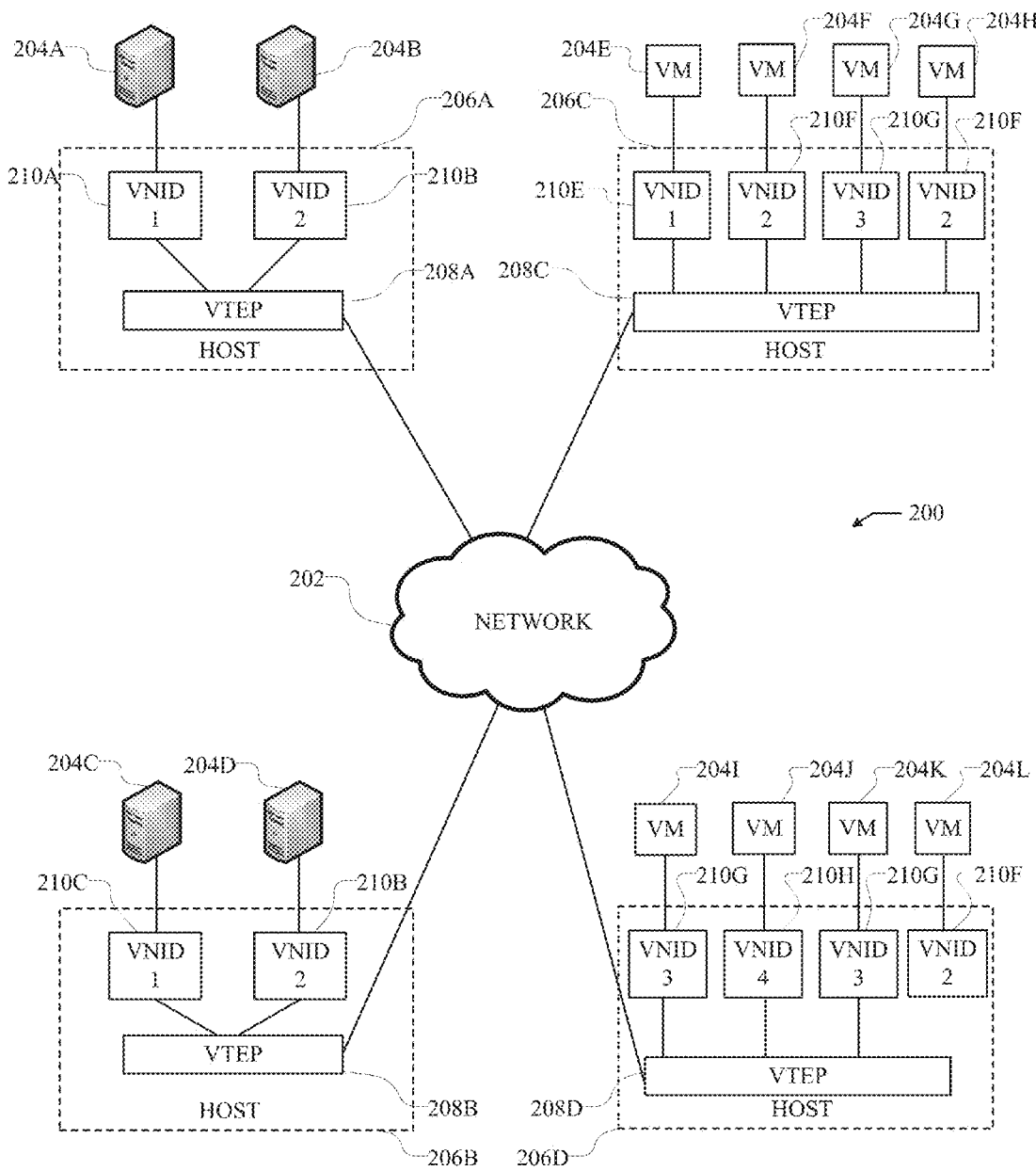
FIG. 2 illustrates an example overlay network.

FIG. 2 illustrates an exemplary overlay network 200. Overlay network 200 uses an overlay protocol, such as VXLAN, VGRE, VO3, or STT, to encapsulate traffic in L2 and/or L3 packets which can cross overlay L3 boundaries in the network. As illustrated in FIG. 2, overlay network 200 can include hosts 206A-D interconnected via network 202.

Network 202 can include a packet network, such as an IP network, for example. Moreover, network 202 can connect the overlay network 200 with the fabric 100 in FIG. 2. For example, VTEPs 208A-D can connect with the leaf switches 104 in the fabric 100 via Network 202.

Hosts 206A-D include virtual tunnel end points (VTEP) 208A-D, which can be virtual nodes or switches configured to encapsulate and de-encapsulate data traffic according to a specific overlay protocol of the network 200, for the various virtual network identifiers (VNIDs) 210A-D. Moreover, hosts 206A-D can include servers, hypervisors, or any physical device. For example, hosts 206A and 206B can be physical switches configured to run VTEPs 208A-B and connect to servers 204A-D. Servers 204A-D can then provide services or host virtual workloads through VMs loaded on the servers, for example. For example, servers 204A-D can be service nodes configured as application servers.

In some embodiments, network 200 can be a VXLAN network, and VTEPs 208A-D can be VXLAN tunnel end points. However, as one of ordinary skill in the art will readily recognize, network 200 can represent any type of overlay or software-defined network, such as NVGRE, STT, or even overlay technologies yet to be invented.

The VNIDs can represent the segregated virtual networks in overlay network 200. Each of the overlay tunnels (VTEPs 208A-D) can include one or more VNIDs. For example, VTEP 208A can connect to virtual or physical devices or workloads residing in VNIDs 1 and 2; VTEP 208B can connect to virtual or physical devices or workloads residing in VNIDs 1 and 3, VTEP 208C can connect to virtual or physical devices or workloads residing in VNIDs 1, 2, 3, and another instance of VNID 2; and VTEP 208D can connect to virtual or physical devices or workloads residing in VNIDs 3 and 4, as well as separate instances of VNIDs 2 and 3.

As one of ordinary skill in the art will readily recognize, any particular VTEP can, in other embodiments, have numerous VNIDs, including more than those VNIDs illustrated in FIG. 2. Moreover, any particular VTEP can connect to physical or virtual devices or workloads residing in one or more VNIDs. Further, a VTEP can connect to one or more service nodes, clusters, or EPGs, for example.

The traffic in overlay network 200 can be segregated logically according to specific VNIDs. This way, traffic intended for VNID 1 can be accessed by devices residing in VNID 1, while other devices residing in other VNIDs (e.g., VNIDs 2, 3, and 4) can be prevented from accessing such traffic. In other words, devices or endpoints in specific VNIDs can communicate with other devices or endpoints in the same specific VNIDs, while traffic from separate VNIDs can be isolated to prevent devices or endpoints in other specific VNIDs from accessing traffic in different VNIDs.

Each of the servers 204A-D and VMs 204E-L can be associated with a respective VNID or virtual segment, and communicate with other servers or VMs residing in the same VNID or virtual segment. For example, server 204A can communicate with server 204C and VM 204E because they all reside in the same VNID, viz., VNID 1. Similarly, server 204B can communicate with VMs 204F, 204H, and 204L because they all reside in VNID 2.

Each of the servers 204A-D and VMs 204E-L can represent a single server or VM, but can also represent multiple servers or VMs, such as a cluster or collection of servers or VMs. Moreover, VMs 204E-L can host virtual workloads, which can include application workloads, resources, and services, for example. On the other hand, servers 204A-D can host local workloads on a local storage and/or a remote storage, such as a remote database. However, in some cases, servers 204A-D can similarly host virtual workloads through VMs residing on the servers 204A-D.

VTEPs 208A-D can encapsulate packets directed at the various VNIDs 1-4 in the overlay network 200 according to the specific overlay protocol implemented, such as VXLAN, so traffic can be properly transmitted to the correct VNID and recipient(s) (i.e., server, VM, service node, or endpoint). Moreover, when a switch, router, or other network device receives a packet to be transmitted to a recipient in the overlay network 200, it can analyze a routing table, such as a lookup table, to determine where such packet needs to be transmitted, so the traffic reaches the appropriate recipient. For example, if VTEP 208A receives a packet from endpoint 204B that is intended for endpoint 204H, VTEP 208A can analyze a routing table that maps the intended endpoint, endpoint 204H, to a specific switch that is configured to handle communications intended for endpoint 204H. VTEP 208A might not initially know, when it receives the packet from endpoint 204B, that such packet should be transmitted to VTEP 208D in order to reach endpoint 204H. Accordingly, by analyzing the routing table, VTEP 208A can lookup endpoint 204H, which is the intended recipient, and determine that the packet should be transmitted to VTEP 208D, as specified in the routing table based on endpoint-to-switch mappings or bindings, so the packet can be transmitted to, and received by, endpoint 204H as expected.

Each VTEP 208A-D typically maintains a forwarding table containing an entry for all the endpoints (i.e., servers and VMs) in the network 200, or at least those entries that are local to VTEP or that VTEP otherwise knows about. However, in some embodiments, as new devices are added to the network 200, the VTEPs attached to the new devices or residing in the network of the new devices can learn of the routing information of the new devices, and update the forwarding table. The updated forwarding table then can be converged so all the VTEPs 208A-D can update their forwarding tables and maintain an accurate account of the network. In some embodiments, VTEPs 208A-D can also maintain other mappings, such as load balancer (LB) to service node mappings or hash buckets to service node mappings, as will be further described below on FIGS. 3-4.

As one of ordinary skill in the art will readily recognize, the examples and technologies provided above are simply for clarity and explanation purposes, and can include many additional concepts and variations.

Figure 3:
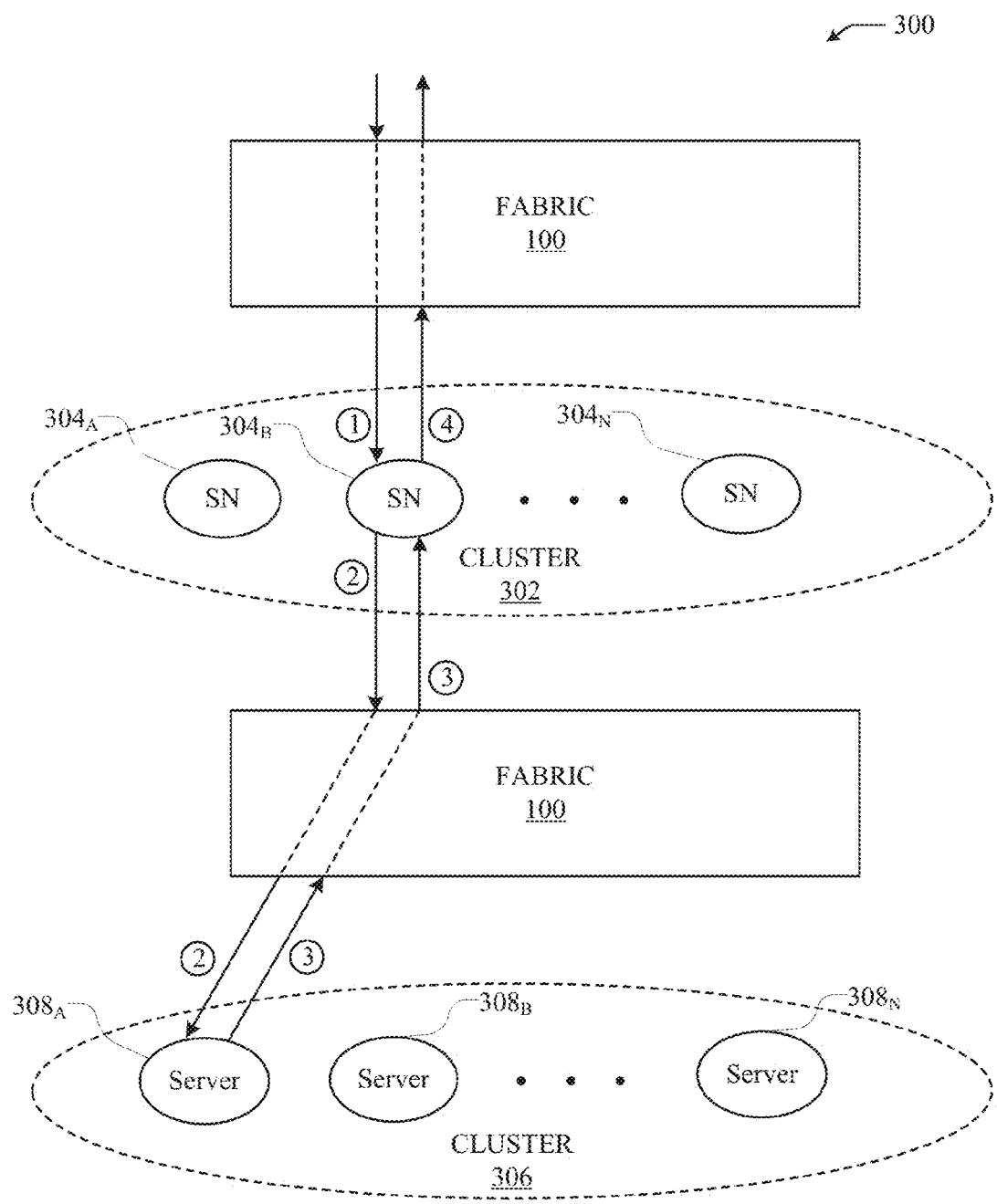
FIG. 3 illustrates a diagram of an example flow distribution in a network with clusters of service nodes.

FIG. 3 illustrates a diagram 300 of an example flow distribution in a network with clusters of service nodes. Here, the fabric 100 can be connected to a cluster 302 of service nodes 304A-304N (collectively "304"). The service nodes 304 may be any type of service appliances, such as load balancers, forwarders, firewalls, application delivery controllers (ADCs), network controllers, etc. For example, the service nodes 304 can be load balancers configured to load balance specific types and/or flows of traffic from the fabric 100.

In some embodiments, the service nodes 304 in the cluster 302 can be connected to one or more leaf switches 304 on the fabric. Thus, the leaf switches 304 can forward traffic from the fabric 100 to specific service nodes 304 in the cluster. For example, the fabric 100 can first receive traffic intended to a specific server or service and forward the traffic to a selected service node 304 in the cluster 302. In some embodiments, the service nodes 304 are selected for specific packets, flows, or traffic based on a hashing scheme as described in FIGS. 4-5 below.

After receiving traffic from the fabric 100, the service nodes 304 can steer the traffic to the servers $308_A$-$308_N$ (collectively "308") in the cluster 306 according to the specific destination, service, traffic, and/or information associated with the traffic. The servers 308 can be any type of physical and/or virtual servers, such as web servers, file transfer protocol (FTP) servers, file servers, storage or database servers, dynamic host configuration protocol (DHCP) servers, and so forth. The servers 308 can be grouped into the cluster 306 to provide multiple instances of the server and/or service for various reasons, including redundancy, load balancing, performance, security, etc.

Moreover, the cluster 306 can include one or more clusters of servers 308. For example, in some cases, the cluster 306 can be a collection of pool of multiple clusters of servers. Also, the cluster 306 can be of any size as determined by the administrator and the circumstances. In particular, the cluster

306 can vary in the number of servers 308 it contains based on specific preferences, selections, and/or circumstances. For example, in some cases, the cluster 306 may include 10 servers 308, while in other cases, the cluster 306 may include 100 servers 308.

The selected server(s) 308 can receive traffic from the fabric 100, which is forwarded from one of the service nodes 304, and process the traffic according to the specific service and configuration of the servers 308. The selected server(s) 308 then transmit the processed traffic back to the fabric 100, to be returned to the specific one of the service nodes 304 which previously transmitted the traffic to the selected server(s) 308. The specific service node 304 receives the traffic back from the selected server(s) 308 and sends the traffic to the intended recipient, through the fabric 100.

For example, the fabric 100 can receive a packet for a service appliance in the cluster 306 of servers 308. The fabric 100 (e.g., a leaf switch 304 in the fabric 100) first sends the packet to service node 304B. The service node 304B examines the packet and identifies server 308A in the cluster 306 to service the packet. Next, service node 304B sends the packet to the fabric 100 (e.g., a leaf switch 304 in the fabric 100) to be routed to the server 308A. The fabric 100 (e.g., a leaf switch 304 in the fabric 100) then routes the packet to server 308A, which receives the packet and processes the packet. After processing the packet, the server 308A sends the processed packet to the fabric 100 (e.g., a leaf switch 304 in the fabric 100), which then routes the packet back to the service node 304B. The service node 304B can receive the processed packet and send it back to the fabric 100 to be routed to the proper destination or origin.

In some embodiments, the service node 304B can ensure equal load distribution and balancing of traffic to the fabric 100 and servers 308. In addition, the service node 304B can ensure that both directions of a flow of packets are treated similarly, or handled by the same servers and service nodes. Indeed, this mechanism of selecting a service node to determine the appropriate server to process a designated flow for that service node can ensure that the service node that owns a flow state handles the flow's packets in in both directions.

Figure 4:
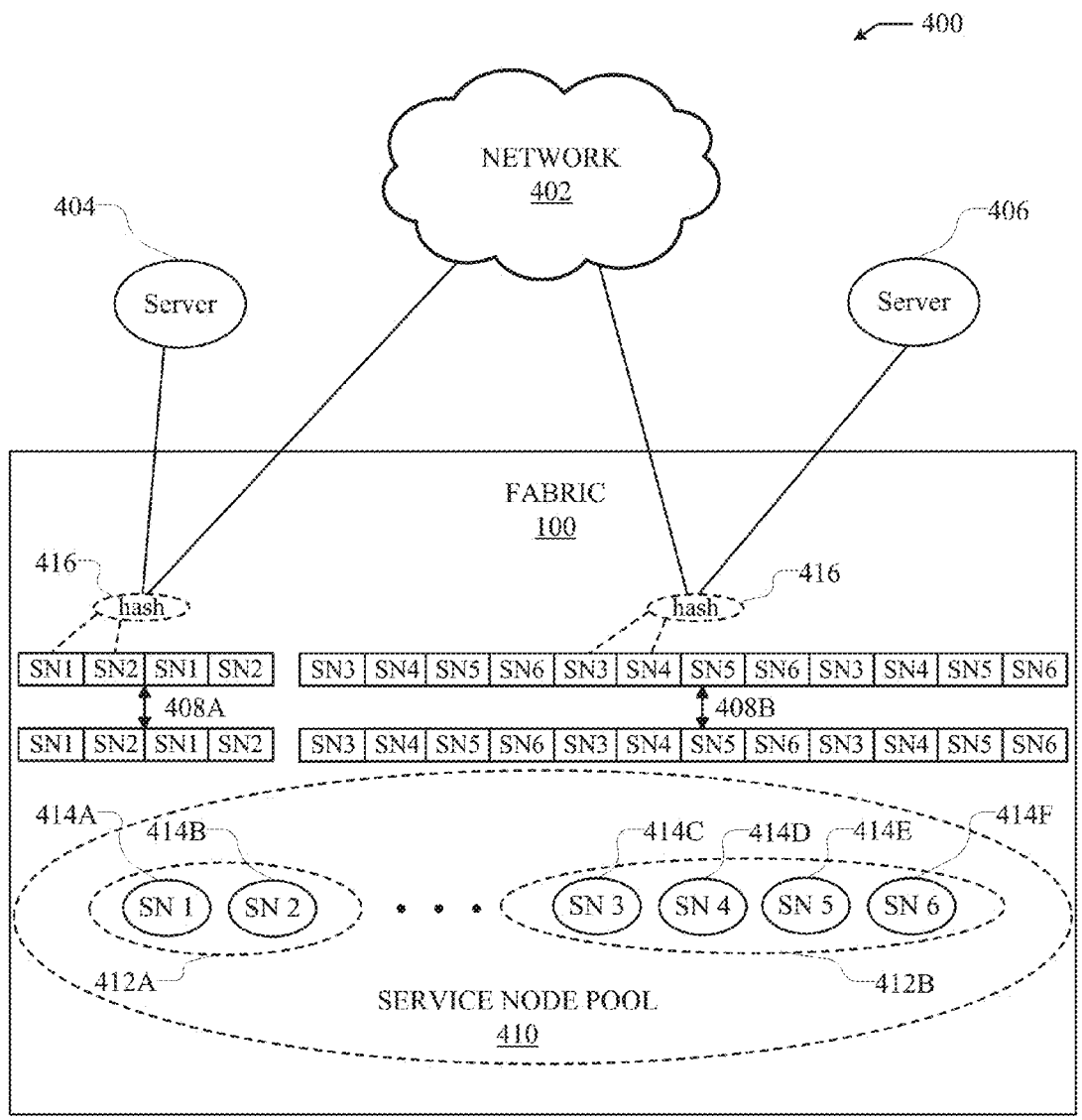
FIG. 4 illustrates a schematic block diagram of an example forwarding scheme according to one embodiment.

FIG. 4 illustrates a schematic block diagram of an example forwarding scheme 400 according to one embodiment. The forwarding scheme 400 can be implemented in a network fabric 100. The fabric 100 can be connected to a network 402, which can be an L2 and/or L3 network, such as an IP network. The network 402 can send service requests to the fabric 100, to receive services from service appliances connected to the fabric 100, such as servers 404 and 406. Servers 404 and 406 can be any service appliance, such as a web server, a database server, an email server, etc.

The fabric 100 can include a service node pool 410 which includes one or more clusters, such as clusters 412A and 412B. The clusters 412A and 412B can include service nodes 414A-F (collectively "414"). For example, cluster 412A can include service nodes 414A and 414B, and cluster 412B can include service nodes 414C-F. The service nodes 414 can include any type of physical or virtual service node or appliance, such as load balancers, firewalls, ADCs, content switching applications or devices, application optimization services, network controllers, storage management appliances, forwarding services, proxy services, virtualization services, intrusion prevention services, and so forth. Moreover, the service nodes 414 can be located independent of other service nodes 414. In other words, the service nodes 414 can be located next to each other or physically proximate to each other, but can also be located separate from each other or in a distributed fashion. Thus, in some cases, the service nodes 414 do not have to be located next or proximate to each other. This can provide some flexibility in implementing the service nodes 414 in the fabric 100 or any network.

The fabric 100 can distribute flows to the servers 404 and 406 by directing the flows to selected service nodes 414 configured to steer the flows to particular servers 404 and 406. In some embodiments, the fabric 100, or one or more controllers (not shown) in the fabric 100, can select service nodes 414 for specific flows by applying consistent hashing of the flows, using consistent hashes 416, to service buckets 408A and 408B (collectively "408"). A service bucket can be an indirection/hash bucket that acts as a unit of service function for load distribution to service nodes 414.

The service buckets 408 can include any number of service buckets, such as 2, 4, 8, 16, 32, 48, etc. In some embodiments, the service buckets 408 can include 16 buckets in the fabric 100. Moreover, each of the service buckets 408 can be assigned to one or more specific service nodes 414 and/or clusters 412A-B. For example, a service bucket can be assigned to cluster 412A and service node 1 in cluster 412A. Thus, any flows that hash to that service bucket can be processed by service node 1 in cluster 412A. Further, a fixed number of service buckets 408 can be implemented for each service. For example, a web service can have 4 service buckets 408 assigned to it. In some cases, the number of service buckets 408 can be greater or equal to the number of service nodes 414 in the fabric 100. As the number of flows and service buckets increases, the variance can decrease, thus balancing the load distribution more evenly among the devices.

The service buckets 408 can be implemented or processed by a device or appliance in the fabric 100, such as a fabric configuration server, a fabric controller, a switch, a virtual appliance, etc. Moreover, the service buckets 408 can include primary buckets and secondary (i.e., backup or standby) buckets.

The primary and secondary buckets can be mapped to different service nodes, such that if a service node that is expected to service a flow fails, the secondary bucket can be used to identify a backup service node to process the flow after the failure. However, in some embodiments, the primary and secondary buckets can be mapped to the same service node. Indeed, in some cases, a service node can be mapped to multiple service buckets to allow traffic to be distributed according to servicing proportions or preferences, for example. Also, in some cases, the service buckets 408 may only include a primary buckets, however, in other cases, the service buckets 408 may otherwise include more than a pair (i.e., primary and secondary) of buckets.

The primary and secondary service nodes can maintain and/or synchronize detailed flow state to allow either service node to service a flow mapped to the primary service node. In some embodiments, the service nodes 414 can perform 1:1 flow state synchronization for high availability (HA). Moreover, the mapping of service buckets 408 to service nodes 414 and/or clusters 412 can be stored and/or maintained by one or more switches in the fabric 100. For example, spine switches 102 and leaf switches 104 in the fabric 100 can include software defining the mapping of service or hash buckets to service nodes. Thus, if the primary service node for a flow fails, the software on the switch can steer the flow to the secondary service node as backup or failsafe. The mapping of service buckets 408 to service nodes 414 can also be coordinated between the service nodes 414 and the fabric 100, including one or more switches in the fabric 100. In some embodiments, the leaf switches 104 or the provider edge devices can be configured to direct or redirect traffic based on the mapping of service buckets 408 to service nodes 414, as well as the configuration of primary and secondary service nodes.

The consistent hash 416 applied to a flow to identify a service bucket for that flow can be direction agnostic for the flow, meaning it can be applied to the flow in either direction with the same results. Thus, the flow will map to the same service bucket 408 in either direction (i.e., incoming and outgoing). The consistent hash 416 can be based on an n-tuple of a packet header, such as a 5-tuple of a packet header fields. The consistent hash 416 can be consistently implemented based on the same hash function and the same header fields across all flows. For example, the consistent hash 416 can be applied to specific header fields, such as a packet's destination address, source address, destination port, source port, protocol, etc. Since the consistent hash 416 is agnostic to the flow's direction, it can result in the same service node being selected for a flow irrespective of the flow's or packet's direction, thus avoiding flow state shuffling or movement and packet reordering.

Indeed, the consistent hash 416 and forwarding scheme 400 can avoid flow state movement or shuffling and packet reordering even when a service node or a device modifies a packet. For example, if a service node modifies the packet by, for example, performing a full proxy or network address translation (NAT), the service node can pick the same fields, such as the same 5-tuple, of the flow to ensure that the packet comes back to the same service node from the servers 404 and 406. To illustrate, a load balancer operating in secure network address translation (SNAT) mode can set the source IP and/or L4 source port such that the consistent hash 416 generates a hash bucket result that the load balancer owns, irrespective of the direction of the packet and flow. This can ensure that the packet in the reverse direction (e.g., for the server, such as a web server, to the load balancer and client) would be directed back to the same service node (e.g., ADC, LB, FW, etc.).

Furthermore, the consistent hash 416 and forwarding scheme 400 can also be implemented to support unequal load balancing of traffic. For example, a service node 414 which supports more traffic than another service node 414 can be assigned a greater number of service buckets 408, and thus a greater amount of traffic to process. Likewise, a service node 414 with lesser capacity can be assigned a lower number of service buckets 408, and thus a smaller amount of traffic to process.

Figure 5:
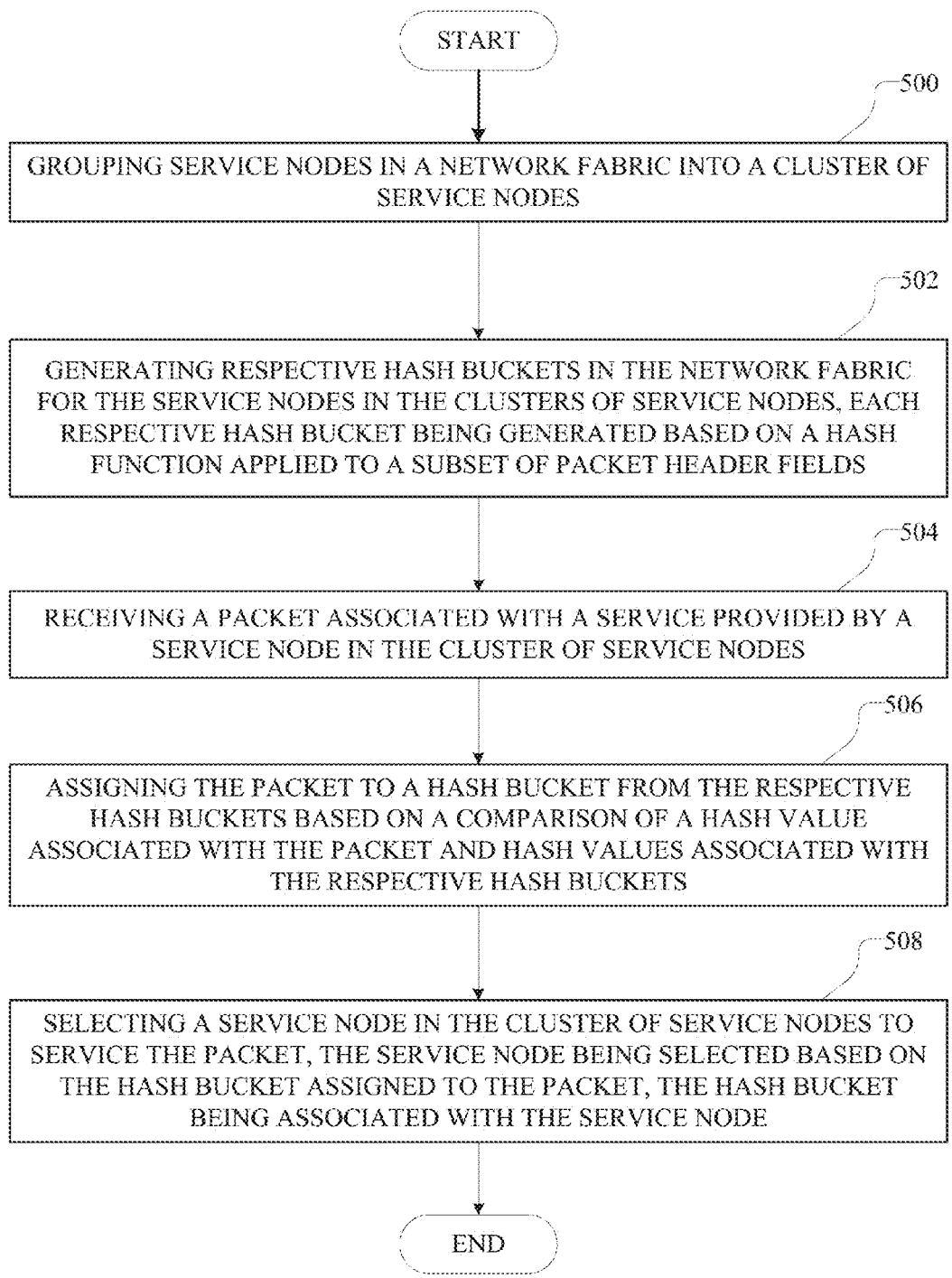
FIG. 5 illustrates an example method embodiment.
Figure 6:
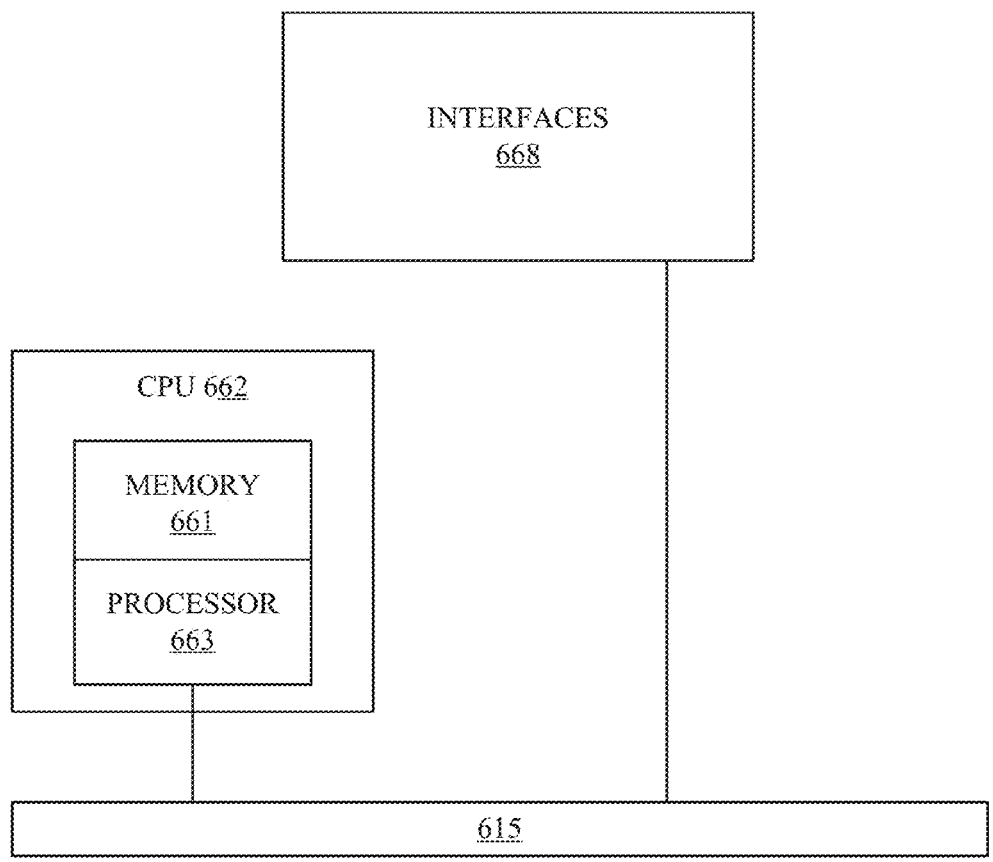
FIG. 6 illustrates an example network device.

Having disclosed some basic system components and concepts, the disclosure now turns to the exemplary method embodiment shown in FIG. 5. For the sake of clarity, the method is described in terms of a fabric 100, as shown in FIG. 1, configured to practice the method. The steps outlined herein are exemplary and can be implemented in any combination thereof, including combinations that exclude, add, or modify certain steps.

The fabric 100 can first group service nodes in the fabric 100 into a cluster of service nodes (500). The fabric 100 can group service nodes according to a service, a preference, traffic characteristics, traffic expectations, fabric characteristics, quality of service (QoS) expectations, service level agreements (SLAs), a number of hash buckets, etc.

The fabric 100 can then generate respective hash buckets in the fabric 100 for the service nodes in the clusters of service nodes, each respective hash bucket being generated based on a hash function applied to a subset of packet header fields (502). In some embodiments, the hash buckets can be generated based on a consistent hash 408, as illustrated in FIG. 4. For example, the hash buckets can be generated based on an n-tuple, such as a 5-tuple, according to information associated with the service nodes, the fabric 100, routing information, etc. In some embodiments, the hash buckets are generated based on a hash function applied to a service node's IP address, a destination port, a protocol or service, a source IP address, a source port, etc.

The fabric 100 then receives a packet flow associated with a service provided by one or more service nodes in the cluster (504) and assigns the packet to a hash bucket from the respective hash buckets based on a comparison of a hash value associated with the packet and hash values associated with the respective hash buckets (506). For example, the fabric 100 can receive a packet from a flow and assign the packet to a hash bucket, such as a service bucket 408 illustrated in FIG. 4, by applying a consistent hash function, such as consistent hash 408 illustrated in FIG. 4, to the packet. The consistent hash function can be applied to a consistent set of packet header fields, such as an n-tuple including the source IP address, the destination IP address, the L4 destination port, the L4 source port, the protocol, etc.

Next, the fabric 100 selects a service node in the cluster of service nodes to service the packet, the service node being selected based on the hash bucket assigned to the packet, the hash bucket being associated with the service node (508). For example, the fabric 100 can receive a packet from a flow and identify a service node to process the packet based on a determination that the packet maps to a hash bucket assigned to the service node. The determination that the packet maps to the hash bucket assigned to the service node can be made based on a consistent hash function (e.g., consistent hash 408) applied to an n-tuple of the packet header, such as the source IP address, the destination IP address, the L4 destination port, the L4 source port, the protocol, etc. The fabric 100 can then route or steer the packet to the service node for processing. The service node can then transmit the packet to the fabric 100, to be then transmitted to the appropriate server or service appliance to process the packet.

The server or service appliance can process the packet and then return the processed packet to the service node through the fabric 100. The service node then processes the packet and sends it to the fabric 100 to be sent to the client or originating device.

While the steps in the method of FIG. 5 are described as being implemented by the fabric 100, one of ordinary skill in the art will readily recognize that these steps can be performed by one or more devices in the fabric 100, switch as one or more leaf switches or provider edge devices; a fabric or network controller in the fabric 100; software implemented on any other device in the fabric 100 or connected to the fabric 100; or any other device, such as any of the example devices described below in FIGS. 6 and 7. However, for the sake of clarity, the fabric 100 is described as implementing the steps in the method as a non-limiting example.

Example Devices

FIG. 6 illustrates an example network device 610 suitable for implementing the present invention. Network device 610 includes a master central processing unit (CPU) 662, interfaces 668, and a bus 615 (e.g., a PCI bus). When acting under the control of appropriate software or firmware, the CPU 662 is responsible for executing packet management, error detection, and/or routing functions, such as miscabling detection functions, for example. The CPU 662 preferably accomplishes all these functions under the control of software including an operating system and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a specific embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 770 and random access memory (RAM) 775, to the processor 710. The system 700 can include a cache of high-speed memory connected directly with, in close proximity to, or integrated as part of the processor 710. The system 700 can copy data from the memory 715 and/or the storage device 730 to the cache 717 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 737, module 7 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 775, read only memory (ROM) 770, and hybrids thereof.

The storage device 730 can include software modules 737, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

I claim:

1. A method comprising:
receiving, by a computing device in a network fabric, a packet associated with a service provided by at least one service node included in one cluster of a plurality of clusters of service nodes, each cluster of the plurality of clusters including one or more service nodes and being assigned to at least one hash bucket from a plurality of hash buckets, wherein each hash bucket is assigned a bucket hash value generated by applying a hash function to a unique combination of at least a port number value and an address value;
applying the hash function to a port number of the packet and an address value of the packet to determine a hash value of the packet;
determining that a hash bucket value of a first hash bucket from the plurality of hash buckets matches the hash value of the packet;
in response to determining that a hash bucket value of a first hash bucket from the plurality of hash buckets matches the hash value of the packet, assigning the packet to the first hash bucket; and
selecting a first service node to service the packet, the first service node being selected from the first hash bucket assigned to the packet.

2. The method of claim 1, further comprising routing the packet between the network fabric and the first service node selected.

3. The method of claim 1, further comprising generating the plurality of clusters of service nodes, wherein service chains are load balanced to pairs of service nodes in the plurality of clusters.

4. The method of claim 1, wherein a service node is assigned to a predetermined number of hash buckets, wherein a total predetermined number of hash buckets is greater than or equal to a total number of service nodes.

5. The method of claim 1, wherein each hash bucket is assigned a primary application service node and a secondary service node, and wherein traffic routed to the primary service node is re-routed to the secondary service node upon a failure of the primary service node.

6. The method of claim 1, wherein a networking device in the network fabric is notified of each hash bucket-to-service node mapping, the networking device comprising at least one of a network controller and a switch in the network fabric.

7. The method of claim 1, wherein ownership of hash buckets by service nodes is coordinated between the service nodes and the network fabric.

8. The method of claim 1, wherein the network fabric comprises one or more virtual switches used to transmit data packets between nodes in the network fabric.

9. A computing device in a network fabric comprising:
one or more computer processors; and
a memory storing instructions that, when executed, cause the computing device to:
receive a packet associated with a service provided by at least one service node included in one cluster of a plurality of clusters of service nodes, each cluster of the plurality of clusters including one or more service nodes and being assigned to at least one hash bucket from a plurality of hash buckets, wherein each hash bucket is assigned a bucket hash value generated by applying a hash function to a unique combination of at least a port number value and an address value;

apply the hash function to a port number of the packet and an address value of the packet to determine a hash value of the packet;

determine that a hash bucket value of a first hash bucket from the plurality of hash buckets matches the hash value of the packet;

in response to determining that a hash bucket value of a first hash bucket from the plurality of hash buckets matches the hash value of the packet, assign the packet to the first hash bucket; and select a first service node to service the packet, the first service node being selected from the first hash bucket assigned to the packet.

10. The computing device of claim 9, wherein the instructions further cause the computing device to route the packet between the network fabric and the first service node selected.

11. The computing device of claim 9, wherein the instructions further cause the computing device to generate the plurality of clusters of service nodes, wherein service chains are load balanced to pairs of service nodes in the plurality of clusters.

12. The computing device of claim 9, wherein a service node is assigned to a predetermined number of hash buckets, wherein a total predetermined number of hash buckets is greater than or equal to a total number of service nodes.

13. The computing device of claim 9, wherein each hash bucket is assigned a primary application service node and a secondary service node, and wherein traffic routed to the primary service node is re-routed to the secondary service node upon a failure of the primary service node.

14. The computing device of claim 9, wherein a networking device in the network fabric is notified of each hash bucket-to-service node mapping, the networking device comprising at least one of a network controller and a switch in the network fabric.

15. The computing device of claim 9, wherein ownership of hash buckets by service nodes is coordinated between the service nodes and the network fabric.

16. The computing device of claim 9, wherein the network fabric comprises one or more virtual switches used to transmit data packets between nodes in the network fabric.

17. A non-transitory computer-readable medium storing instructions that, when executed by a computing device in a network fabric, cause the computing device to:

receive a packet associated with a service provided by at least one service node included in one cluster of a plurality of clusters of service nodes, each cluster of the plurality of clusters including one or more service nodes and being assigned to at least one hash bucket from a plurality of hash buckets, wherein each hash bucket is assigned a bucket hash value generated by applying a hash function to a unique combination of at least a port number value and an address value;

apply the hash function to a port number of the packet and an address value of the packet to determine a hash value of the packet;

determine that a hash bucket value of a first hash bucket from the plurality of hash buckets matches the hash value of the packet;

in response to determining that a hash bucket value of a first hash bucket from the plurality of hash buckets matches the hash value of the packet, assign the packet to the first hash bucket; and select a first service node to service the packet, the first service node being selected from the first hash bucket assigned to the packet.

18. The non-transitory computer-readable medium of claim 17, wherein the instructions further cause the computing device to route the packet between the network fabric and the first service node selected.

19. The non-transitory computer-readable medium of claim 17, wherein the instructions further cause the computing device to generate the plurality of clusters of service nodes, wherein service chains are load balanced to pairs of service nodes in the plurality of clusters.

20. The non-transitory computer-readable medium of claim 17, wherein the network fabric comprises one or more virtual switches used to transmit data packets between nodes in the network fabric.

* * * * *